US012614203B2

(12) United States Patent
Agrawal et al.

(10) Patent No.: US 12,614,203 B2
(45) Date of Patent: Apr. 28, 2026

(54) SYSTEM AND METHOD FOR INTERACTING WITH AN ELECTRIC TWO-WHEELER VEHICLE USER

(71) Applicant: Oben Electric Vehicles Private Limited, Bangalore (IN)

(72) Inventors: Dinkar Agrawal, Bangalore (IN);
Sagar Thakkar, Ahmedabad (IN);
Rihen Shah, Ahmedabad (IN)

(73) Assignee: Oben Electric Vehicles Private Limited (IN)

( * ) Notice: Subject to any disclaimer, the term of this patent is extended or adjusted under 35 U.S.C. 154(b) by 0 days.

(21) Appl. No.: 18/716,087

(22) PCT Filed: Feb. 14, 2023

(86) PCT No.: PCT/IB2023/051315
§ 371 (c)(1),
(2) Date: Jun. 3, 2024

(87) PCT Pub. No.: WO2023/152724
PCT Pub. Date: Aug. 17, 2023

(65) Prior Publication Data
US 2025/0029133 A1      Jan. 23, 2025

(30) Foreign Application Priority Data
Feb. 14, 2022     (IN) .............................. 202241007628

(51) Int. Cl.
*G06Q 30/0207*         (2023.01)
*B60K 35/10*          (2024.01)
(Continued)

(52) U.S. Cl.
CPC ......... *G06Q 30/0207* (2013.01); *B60K 35/10* (2024.01); *B60K 35/22* (2024.01); *B60K 35/50* (2024.01); *B60K 35/90* (2024.01)

(58) Field of Classification Search
CPC .................................................. G06Q 30/0207
See application file for complete search history.

(56)                References Cited

U.S. PATENT DOCUMENTS

| | | | | |
|---|---|---|---|---|
| 11,516,295 B1 * | 11/2022 | Nemmani | ............... | H04W 4/38 |
| 2011/0241864 A1 * | 10/2011 | Fujiki | .................. | G07C 5/0825 |
| | | | | 340/439 |

(Continued)

OTHER PUBLICATIONS

M. Eider and A. Berl, "Dynamic Generation of Recommendations for EV Battery Health," 2018 International Conference of Electrical and Electronic Technologies for Automotive, Milan, Italy, 2018, pp. 1-6, accessed at https://ieeexplore.ieee.org/document/8493182? source=IQplus, (Year: 2018).*

*Primary Examiner* — Ilana L Spar
*Assistant Examiner* — Melinda Gieringer
(74) *Attorney, Agent, or Firm* — Jason C. Cameron

(57)                ABSTRACT

A system for interacting with an electric vehicle user is disclosed. The electric vehicle is configured with a plurality of sensors and a plurality of slave controllers. The system includes a vehicle data receiving subsystem to receive the captured primary and secondary vehicle parameters. A battery charging pattern score estimation subsystem to calculate a first score point for a degradation of charge patterns of a battery. A braking pattern score estimation subsystem to calculate a second score point for braking applied during driving of the electric vehicle. A battery efficacy score estimation subsystem to calculate a third score point for power consumed at the specified distance. An output subsystem to generate and output recommendations including insights driven from at least one of: the first, second, and the third score point using an artificial intelligence.

28 Claims, 8 Drawing Sheets

100

(51) Int. Cl.
B60K 35/22 (2024.01)
B60K 35/50 (2024.01)
B60K 35/90 (2024.01)

(56) References Cited

U.S. PATENT DOCUMENTS

| | | | |
|---|---|---|---|
| 2015/0112546 A1* | 4/2015 | Ochsendorf | B60W 30/12 |
| | | | 701/33.4 |
| 2016/0209840 A1* | 7/2016 | Kim | B60W 60/0059 |
| 2017/0072850 A1* | 3/2017 | Curtis | B60K 35/85 |
| 2019/0241092 A1* | 8/2019 | Kyes | G07C 5/0808 |
| 2020/0011931 A1* | 1/2020 | Lucidarme | G01R 31/367 |
| 2020/0079387 A1* | 3/2020 | A G | B60W 40/09 |
| 2020/0285970 A1* | 9/2020 | Dagley | G06Q 10/20 |
| 2023/0234592 A1* | 7/2023 | Masquelier | G06Q 50/40 |
| | | | 701/1 |
| 2023/0242111 A1* | 8/2023 | Aggoune | B60W 30/143 |
| | | | 701/22 |
| 2024/0249306 A1* | 7/2024 | Scholl | G07C 5/008 |

* cited by examiner

100

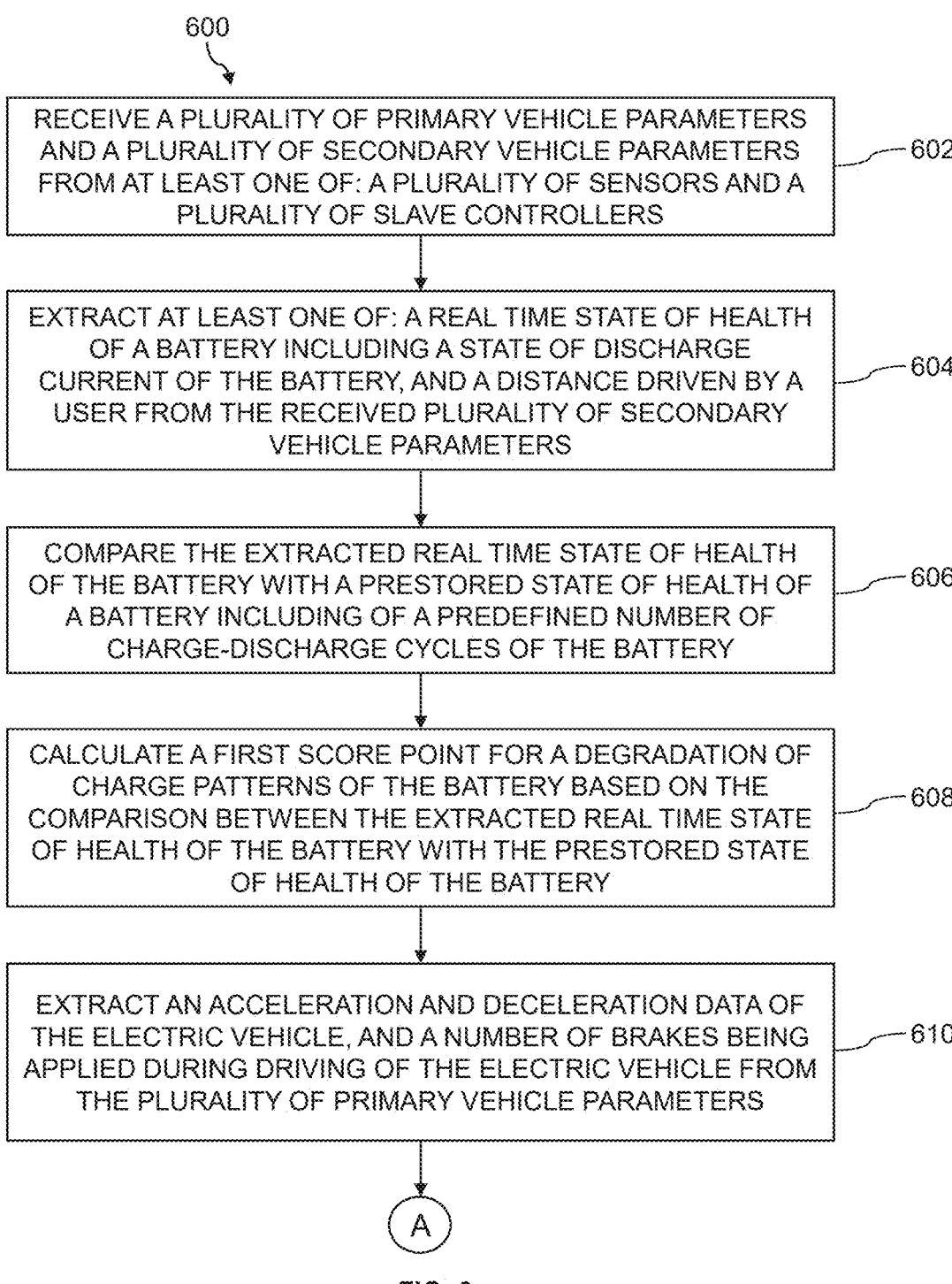

600

RECEIVE A PLURALITY OF PRIMARY VEHICLE PARAMETERS AND A PLURALITY OF SECONDARY VEHICLE PARAMETERS FROM AT LEAST ONE OF: A PLURALITY OF SENSORS AND A PLURALITY OF SLAVE CONTROLLERS — 602

EXTRACT AT LEAST ONE OF: A REAL TIME STATE OF HEALTH OF A BATTERY INCLUDING A STATE OF DISCHARGE CURRENT OF THE BATTERY, AND A DISTANCE DRIVEN BY A USER FROM THE RECEIVED PLURALITY OF SECONDARY VEHICLE PARAMETERS — 604

COMPARE THE EXTRACTED REAL TIME STATE OF HEALTH OF THE BATTERY WITH A PRESTORED STATE OF HEALTH OF A BATTERY INCLUDING OF A PREDEFINED NUMBER OF CHARGE-DISCHARGE CYCLES OF THE BATTERY — 606

CALCULATE A FIRST SCORE POINT FOR A DEGRADATION OF CHARGE PATTERNS OF THE BATTERY BASED ON THE COMPARISON BETWEEN THE EXTRACTED REAL TIME STATE OF HEALTH OF THE BATTERY WITH THE PRESTORED STATE OF HEALTH OF THE BATTERY — 608

EXTRACT AN ACCELERATION AND DECELERATION DATA OF THE ELECTRIC VEHICLE, AND A NUMBER OF BRAKES BEING APPLIED DURING DRIVING OF THE ELECTRIC VEHICLE FROM THE PLURALITY OF PRIMARY VEHICLE PARAMETERS — 610

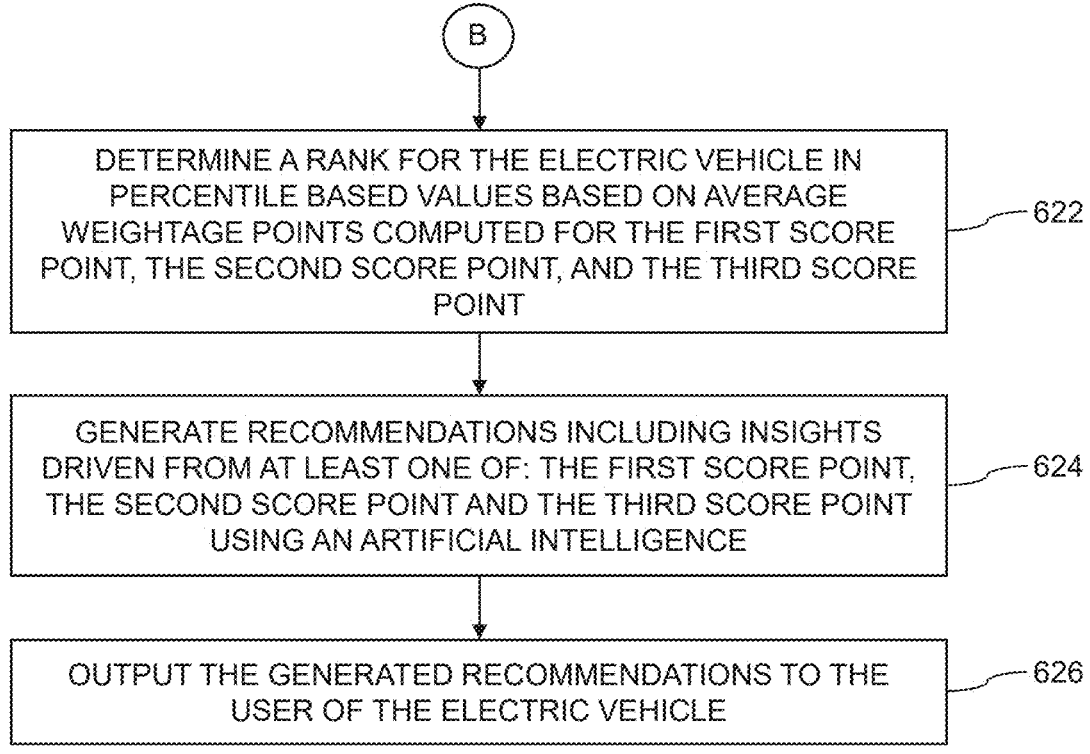

DETERMINE A RANK FOR THE ELECTRIC VEHICLE IN PERCENTILE BASED VALUES BASED ON AVERAGE WEIGHTAGE POINTS COMPUTED FOR THE FIRST SCORE POINT, THE SECOND SCORE POINT, AND THE THIRD SCORE POINT ⟶ 622

GENERATE RECOMMENDATIONS INCLUDING INSIGHTS DRIVEN FROM AT LEAST ONE OF: THE FIRST SCORE POINT, THE SECOND SCORE POINT AND THE THIRD SCORE POINT USING AN ARTIFICIAL INTELLIGENCE ⟶ 624

OUTPUT THE GENERATED RECOMMENDATIONS TO THE USER OF THE ELECTRIC VEHICLE ⟶ 626

FIG. 6
(Contd.)

SYSTEM AND METHOD FOR INTERACTING WITH AN ELECTRIC TWO-WHEELER VEHICLE USER

EARLIEST PRIORITY DATE

This application claims priority from a Provisional patent application filed in India having patent application No. 202241007628, filed on Feb. 14, 2022, and titled "SYSTEM AND METHOD FOR INTERACTING WITH THE ELEC- TRIC TWO-WHEELER VEHICLE USER" and also claims priority from a PCT patent application having Patent Appli- cation No. PCT/IB2023/051315, filed on Feb. 14, 2023, and titled "SYSTEM AND METHOD FOR INTERACTING WITH THE ELECTRIC TWO-WHEELER VEHICLE USER.

FIELD OF INVENTION

Embodiments of the present disclosure relate to electric vehicles, and more particularly to a system and a method for interacting with a user of an electric two-wheeler vehicle and rewarding the user on the basis of drivetrain efficiency.

BACKGROUND

Internal combustion (IC) engine vehicles release harmful gases in the environment as the engine is powered by non-renewable fuel energy resources. Alternatively, electric vehicles may be used to control increasing pollution. Fur- ther, the electric vehicles are cheaper to run, cheaper to maintain, cheaper to register, and the like.

Although there is a sharp increase in the use of the electric vehicles, electric vehicle owners are not aware about the usage and drivability parameters of the electric vehicles. Typically, drivetrain of the electric vehicles is responsible for taking energy stored in the electric vehicle's battery system and supplying the energy to motors of the electric vehicles. Managing of the electric vehicles is nowadays challenging as efficiency of the drivetrain is not utilized properly, and also users (i.e., owners) of the electric vehicle often tend to be unaware of their electric vehicles.

Further, any electric vehicle operation differs from normal internal combustion engine vehicle operation. The efficiency of the electrical vehicle decreases with rough and irregular usage. Maximum power of the electrical vehicles is wasted due to inefficiency of the electric vehicle drivetrain, and therefore less power is only utilized to drive the wheels of the electric vehicle. An efficient approach would be to promote proper usage and maintenance of electric vehicles to increase life of the electric vehicles, thereby promoting environment friendly commutation.

Furthermore, people are shifting from IC engine to elec- tric vehicles and hence the people do not have proper knowledge on driveability, and the people would lose on efficiency and use more power. It is important to provide the people with indicators that show the people the right way to drive the EV to get maximum efficiency.

Hence, there is a need for an improved system for interacting with a user of an electric two-wheeler vehicle to address the aforementioned issues.

SUMMARY

This summary is provided to introduce a selection of concepts, in a simple manner, which is further described in the detailed description of the disclosure. This summary is neither intended to identify key or essential inventive con- cepts of the subject matter nor to determine the scope of the disclosure.

In accordance with one embodiment of the disclosure, a system for interacting with a user of an electric vehicle using an electric vehicle rewarding system is disclosed. The sys- tem includes one or more hardware processors and a memory coupled to the one or more hardware processors. The memory includes a set of program instructions in the form of a plurality of subsystems, configured to be executed by the one or more hardware processors.

The plurality of subsystems include a vehicle data receiv- ing subsystem, a battery charging pattern score estimation subsystem, a braking pattern score estimation subsystem, a braking pattern score receiving subsystem, a battery efficacy score estimation subsystem, a ranking subsystem, an output subsystem. The vehicle data receiving subsystem receives a plurality of primary vehicle parameters and a plurality of secondary vehicle parameters from at least one of: a plural- ity of sensors, and a plurality of slave controllers.

The battery charging pattern score estimation subsystem extracts at least one of: a real time state of health of a battery including a state of discharge current of the battery, and a distance driven by a user from the received plurality of secondary vehicle parameters. The battery charging pattern score estimation subsystem further compares the extracted real time state of health of the battery with a prestored state of health of a battery including of a predefined number of charge-discharge cycles of the battery. The battery charging pattern score estimation subsystem further calculates a first score point for a degradation of charge patterns of the battery based on the comparison between the extracted real time state of health of the battery with the prestored state of health of the battery.

The braking pattern score estimation subsystem extracts an acceleration and deceleration data of the electric vehicle, and a number of brakes being applied during driving of the electric vehicle from the plurality of primary vehicle param- eters. The braking pattern score estimation subsystem fur- ther calculates a second score point for the braking applied during driving of the electric vehicle based on the extracted acceleration and deceleration data of the electric vehicle and the number of brakes being applied during driving of the electric vehicle. The braking pattern score receiving subsys- tem receives the calculated second score point from the braking pattern score estimation subsystem.

The battery efficacy score estimation subsystem calcu- lates power consumed during driving at a specified distance based on at least one of: the plurality of primary vehicle parameters and the plurality of secondary vehicle parameters received from the vehicle data receiving subsystem. The battery efficacy score estimation subsystem further com- pares the calculated power consumed at the specified dis- tance with a prestored energy consumption level at specified distance. The battery efficacy score estimation subsystem further calculates a third score point for the power consumed at the specified distance in one or more test parameters, wherein the third score point corresponds to a battery efficacy score.

The ranking subsystem determines a rank for the electric vehicle in percentile based values based on average weight- age points computed for the first score point, the second score point, and the third score point. The output subsystem generates recommendations including insights driven from at least one of: the first score point, the second score point and the third score point using an artificial intelligence. The output system further outputs the generated recommendations to the user of the electric vehicle.

In an embodiment, the plurality of subsystems further include a reward score calculation subsystem that computes the average weightage points of the first score point, the second score point and the third score point from the battery charging pattern score estimation subsystem, the braking pattern score receiving subsystem, and the battery efficacy score estimation subsystem.

In another embodiment, the plurality of subsystems further include a reward score generation subsystem that generates score for the electric vehicle corresponding to the rank determined for the electric vehicle based on the percentile based values.

In one aspect, a method for interacting with a user of an electric vehicle using an electric vehicle rewarding system is disclosed. The method includes receiving a plurality of primary vehicle parameters, and a plurality of secondary vehicle parameters from at least one of: a plurality of sensors and a plurality of slave controllers. The method further includes extracting at least one of: a real time state of health of a battery including a state of discharge current of the battery, and a distance driven by a user from the received plurality of secondary vehicle parameters. The method further includes comparing the extracted real time state of health of the battery with a prestored state of health of a battery including of a predefined number of charge-discharge cycles of the battery. The method further includes calculating a first score point for a degradation of charge patterns of the battery based on the comparison between the extracted real time state of health of the battery with the prestored state of health of the battery.

The method further includes extracting an acceleration and deceleration data of the electric vehicle, and a number of brakes being applied during driving of the electric vehicle from the plurality of primary vehicle parameters. The method further includes calculating a second score point for the braking applied during driving of the electric vehicle based on the extracted acceleration and deceleration data of the electric vehicle and the number of brakes being applied during driving of the electric vehicle.

The method further includes receiving the calculated second score point from a braking pattern score estimation subsystem. The method further includes calculating power consumed during driving at a specified distance based on at least one of: the plurality of primary vehicle parameters and the plurality of secondary vehicle parameters received from the vehicle data receiving subsystem. The method further includes comparing the calculated power consumed at the specified distance with a prestored energy consumption level at specified distance. The method further includes calculating a third score point for the power consumed at the specified distance in one or more test parameters.

The method further includes determining a rank for the electric vehicle in percentile based values based on weightage average points computed for the first score point, the second score point and the third score point. The method further includes generating recommendations including insights driven from at least one of: the first score point, the second score point and the third score point using an artificial intelligence. The method further includes outputting the generated recommendations to the user of the electric vehicle.

In an embodiment, the method includes computing the weightage average points for the first score point, the second score point and the third score point. In another embodiment, the method further includes generating score for the electric vehicle corresponding to the rank determined for the electric vehicle based on the percentile based values.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which.

Figure 1:
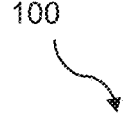
FIG. 1 is a block diagram illustrating an exemplary system for interacting with a user of an electric vehicle using an electric vehicle rewarding system, in accordance with an embodiment of the present disclosure.
Figure 1:
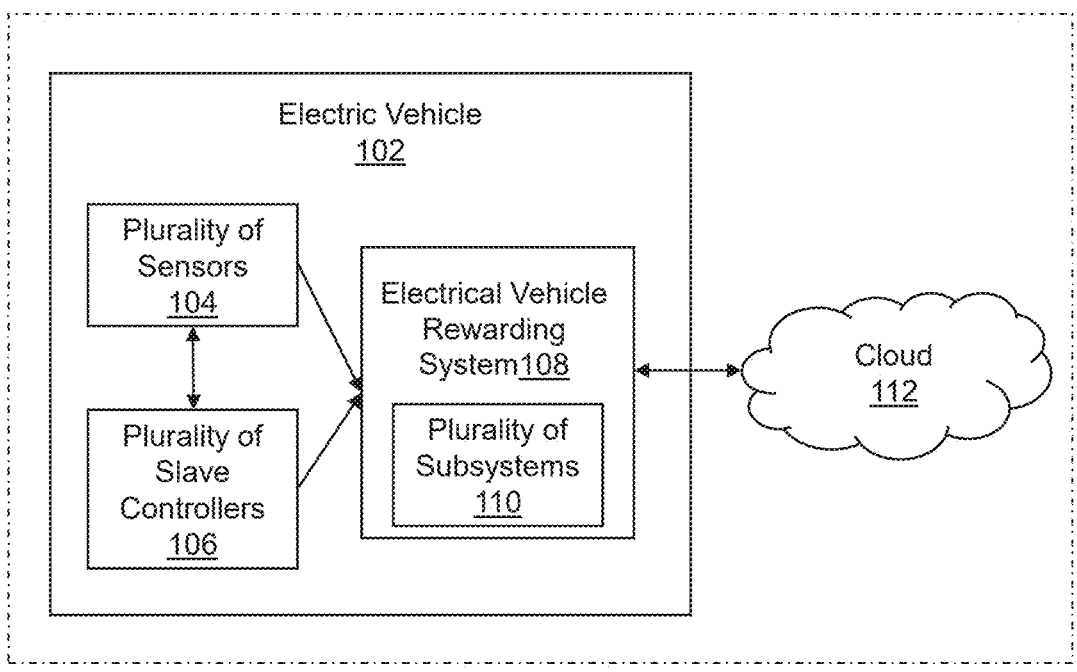

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated online platform, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or subsystems or elements or structures or components preceded by "comprises . . . a" does not, without more constraints, preclude the existence of other devices, subsystems, elements, structures, components, additional devices, additional subsystems, additional elements, additional structures, or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

A computer system (standalone, client or server computer system) configured by an application may constitute a "subsystem" that is configured and operated to perform certain operations. In one embodiment, the "subsystem" may be implemented mechanically or electronically, so a subsystem may comprise dedicated circuitry or logic that is permanently configured (within a special-purpose processor) to perform certain operations. In another embodiment, a "subsystem" may also comprise programmable logic or circuitry (as encompassed within a general-purpose processor or other programmable processor) that is temporarily configured by software to perform certain operations.

Accordingly, the term "subsystem" should be understood to encompass a tangible entity, be that an entity that is physically constructed permanently configured (hardwired) or temporarily configured (programmed) to operate in a certain manner and/or to perform certain operations described herein.

FIG. 1 is a block diagram illustrating an exemplary system 100 interacting with a user of an electric vehicle 102 using an electrical vehicle rewarding system 108, in accordance with an embodiment of the present disclosure. The system 100 includes an electric vehicle (EV) 102 communicatively coupled to a cloud 112. The electric vehicle 102 is a vehicle that uses one or more electric motors for propulsion. The electric vehicle 102 may be powered by a collector system, with electricity from extravehicular sources, or the electric vehicle 102 may be powered autonomously by a battery. The electric vehicle 102 may be a two-wheeler vehicle, a three-wheeler vehicle, a four-wheeler vehicle, and the like.

The electric vehicle 102 is further configured with a plurality of sensors 104. The plurality of sensors 104 are arranged at specific positions within the electric vehicle 102 and associated components. The plurality of sensors 104 are configured to capture a plurality of primary vehicle parameters associated to various components in real time from the electric vehicle 102. The plurality of primary vehicle parameters include at least one of: a number of brakes being applied during driving of the electric vehicle 102, tire pressure of the electric vehicle 102, a degree of throttle which the user rotates while operating the electric vehicle 102, an acceleration and deceleration at a particular distance, revolutions per minute (rpm) at which a motor of the electric vehicle 102 is running, speed of the electric vehicle 102, and an estimation of a state of charge of the electric vehicle 102.

In an embodiment, the plurality of sensors 104 includes a brake switch sensor, a tire pressure sensor, a throttle position sensor, an Inertial measurement Unit (IMU) sensor, a hall sensor, a worm wheel sensor, a current sensor, and the like.

The electric vehicle 102 is also configured with a plurality of slave controllers 106. The plurality of slave controllers 106 are configured to capture plurality of secondary vehicle parameters in real time. The plurality of secondary vehicle parameters include at least one of: occurrence of charging of a battery of the electric vehicle 102, charging levels on which the charging of the battery is started and ended, energy consumed to drive the electric vehicle 102 for one kilometer (km) distance to determine whether the electric vehicle 102 is overloaded, and applied acceleration/brake is harsh, a state of health (SOH) of the battery including a state of charge-discharge current of the battery, and applying of the brake based on revolutions per minute data.

In operation, the system 100 receives the plurality of primary vehicle parameters and the plurality of secondary vehicle parameters from at least one of: the plurality of sensors 104, and the plurality of slave controllers 106. The system 100 further calculates score points (i.e., a first score point, a second score point, and a third score point) associated with at least one of: a degradation of charge patterns of the battery, a number of braking applied during driving of the electric vehicle 102, and power consumed at the specified distance in one or more test parameters based on the plurality of primary vehicle parameters and the plurality of secondary vehicle parameters received from the plurality of sensors 104, and the plurality of slave controllers 106.

Further, the system 100 computes average weightage points for calculated the first score point, the second score point and the third score point. The system 100 further determines a rank for the electric vehicle 102 based on the average weightage points computed for the first score point, the second score point, and the third score point. The system 100 further generates recommendations comprising insights driven from at least one of: the first score point, the second score point and the third score point using an artificial intelligence and outputs the generated recommendations to the user of the electric vehicle 102.

The system further includes an electric vehicle rewarding system 108 that is installed in the electric vehicle 102. The electric vehicle rewarding system 108 includes a plurality of subsystems 110 that help the system 100 to interact with the user of the electric vehicle 102. In an embodiment, the plurality of sensors 104 transmit the plurality of primary vehicle parameters to the plurality of slave controllers 106 or directly to the electric vehicle rewarding system 108. The electric vehicle rewarding system 108 is connected to the cloud 112. Further, the cloud 112 includes a database for storing data.

Figure 2:
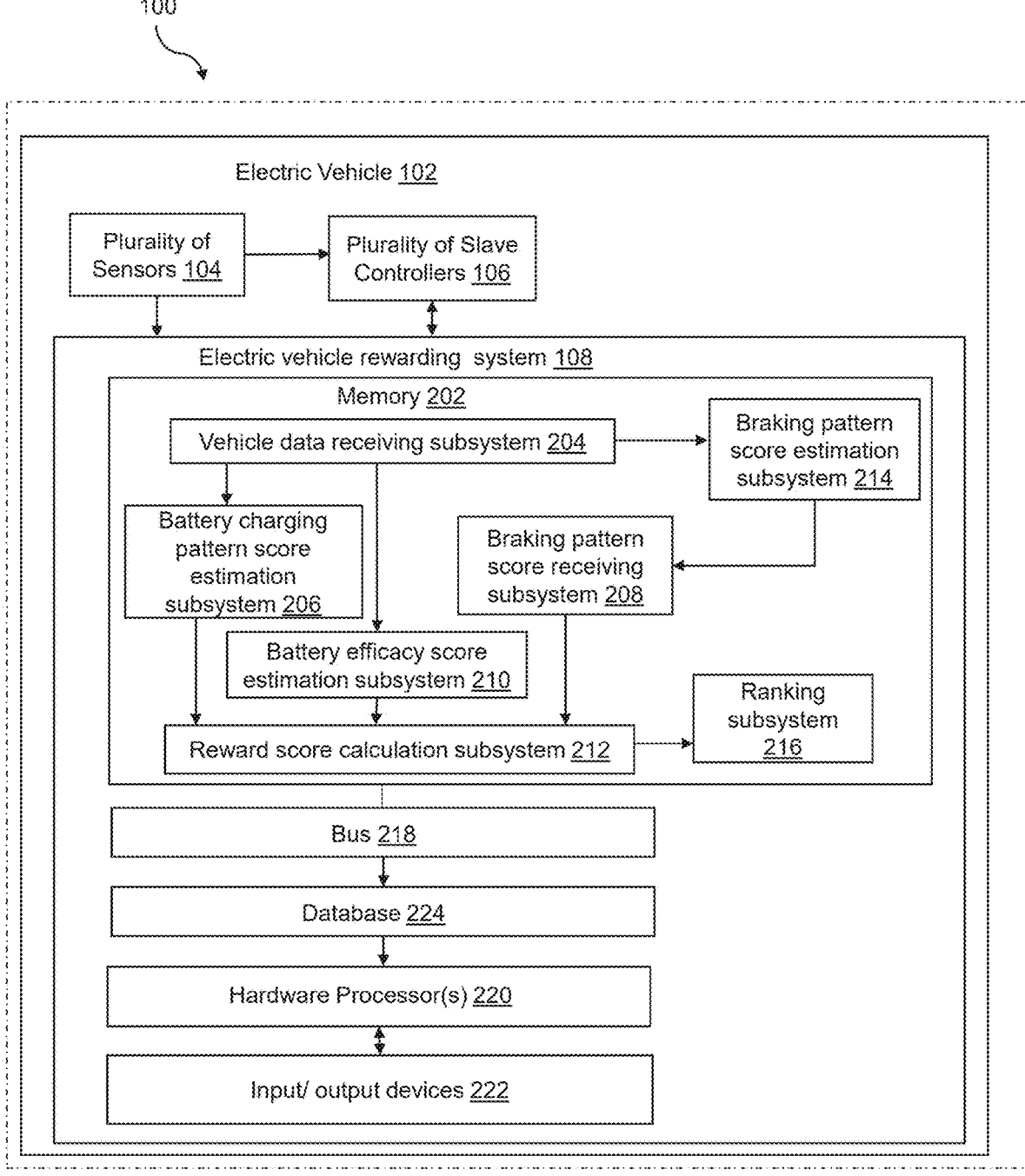
FIG. 2 is an exploded view of the system, such as those shown in FIG. 1, in accordance with an embodiment of the present disclosure.

FIG. 2 is an exploded view of the system 100, such as those shown in FIG. 1, in accordance with an embodiment of the present disclosure. The electric vehicle rewarding system 108 includes a hardware processor(s) 220. The electric vehicle rewarding system 108 further includes a memory 202 coupled to the hardware processor(s) 220. The memory 202 includes a set of program instructions in the form of the plurality of subsystems 110 that are executed by the hardware processor(s) 220.

In an embodiment, the memory 202 may be coupled to the cloud 112 through a communication network. The memory may include a database 224 for storage. In an embodiment, the cloud 112 may include the database 224 for the storage. In an embodiment, the communication network may be at least one of: a local area network (LAN), a wide area network (WAN), a wireless network, a metropolitan area network (MAN), and the like.

The hardware processor(s) 220, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a digital signal processor, or any other type of processing circuit, or a combination thereof.

The memory 202 includes a set of program instructions in the form of a plurality of subsystems 110 and configured to be executed by the hardware processor(s) 220. Input/output (I/O) devices 222 (including but not limited to keyboards, displays, pointing devices, and the like.) may be coupled to the system 100 either directly or through intervening I/O controllers. In one embodiment, the input/output (I/O) devices 222 may be a digital display device.

The plurality of subsystems 110 include a vehicle data receiving subsystem 204, a battery charging pattern estimation subsystem 206, a braking pattern score receiving subsystem 208, a battery efficacy score estimation subsystem 210, a reward score calculation subsystem 212, a braking pattern score estimation subsystem 214, and a ranking subsystem 216. In another embodiment, the braking pattern score estimation subsystem 214 and the ranking subsystem 216 are parts of the cloud 112.

Computer memory elements may include any suitable memory device(s) for storing data and executable program, such as read only memory, random access memory, erasable programable read only memory, electrically erasable programmable read only memory, hard drive, removable media drive for handling memory cards and the like. Embodiments of the present subject matter may be implemented in conjunction with program modules, including functions, procedures, data structures, and application programs, for performing tasks, or defining abstract data types or low-level hardware contexts. Executable program stored on any of the above-mentioned storage media may be executable by the controller or the hardware processor(s) 220.

The plurality of subsystems 110 include the vehicle data receiving subsystem 204 that is communicatively connected to the hardware processor(s) 220. The vehicle data receiving subsystem 204 is configured to receive the captured plurality of primary vehicle parameters from the plurality of sensors 104 and the plurality of secondary vehicle parameters from the plurality of slave controllers 106 in real time. In an embodiment, the plurality of sensors 104 may include at least one of: the brake switch sensor 402, the tire pressure sensor 404, the throttle position sensor 406, an inertial measurement unit (IMU) sensor 408, a hall sensor 410, a worm wheel sensor 412, a current sensor 414, and the like.

The brake switch sensor 402 measures the number of brakes being applied during driving of the electric vehicle 102. The tire pressure sensor 404 measures the tire pressure of the electric vehicle 102. The throttle position sensor 406 measures the degree of throttle which the user rotates while operating the electric vehicle 102. For example, when the throttle is rotated to 30-degree, the throttle position sensor 406 measures that 2.5 volts signal is passed to the motor for propulsion of the electric vehicle 102. When the throttle is rotated to 60-degree, the throttle position sensor 406 measures that 5 volts signal is passed to the motor for propulsion of the electric vehicle 102. The inertial measurement unit (IMU) sensor 408 measures at least one of: force, angular rate, orientation, and the acceleration and deceleration at the particular distance of the electric vehicle 102. In an embodiment, the inertial measurement unit (IMU) is an electronic device that measures and reports an electric vehicle 102 body's specific force, angular rate, and also the orientation of the electric vehicle 102 body using a combination of accelerometers, gyroscopes, and sometimes magnetometers.

The hall sensor 410 measures the revolutions per minute (rpm) at which the motor of the electric vehicle 102 is running. The worm wheel sensor 412 measures the speed of the electric vehicle 102. The current sensor 414 measures electric current in a wire and generates a signal proportional to the electric current to estimate the state of charge of the electric vehicle 102. The plurality of sensors 104 transmits the plurality of primary vehicle parameters to at least one of: the plurality of slave controllers 106, and the electric vehicle rewarding system 108.

The plurality of slave controllers 106 include at least one of: a battery management system (BMS) 502 and a motor controller unit 504. The battery management system 502 provides the plurality of secondary vehicle parameters including at least one of: the state of health (SOH) of the battery including the state of charge-discharge current of the battery, the occurrence of charging of the battery, charging levels on which the charging of the battery is started and ended, the energy consumed to drive the electric vehicle 102 for one kilometer (km) distance to determine whether the electric vehicle 102 is overloaded, and the applied acceleration/brake is harsh. Further, the motor controller unit 504 provides the plurality of secondary vehicle parameters including applying of the brake based on the revolutions per minute data.

In an embodiment, the results from at least one of: the brake switch sensor 402, the throttle position sensor 406, and the hall sensor 410 are transmitted to the motor controller unit 504 of the plurality of slave controllers 106. In another embodiment, the results from the current sensor 414 are transmitted to the battery management system 502 of the plurality of slave controllers 106. In yet another embodiment, the plurality of slave controllers 106 may include a master controller that receives the results from at least one of: the tire pressure sensor 404, the inertial measurement unit (IMU) sensor 408, and the worm wheel sensor 412.

The plurality of subsystems 110 further include a battery charging pattern score estimation subsystem 206 that is communicatively connected to the hardware processor(s) 220. The battery charging pattern score estimation subsystem 206 extracts at least one of: a real time state of health (SOH) of a battery comprising a state of discharge current of the battery, and a distance driven by a user from the received plurality of secondary vehicle parameters. Further, the battery charging pattern score estimation subsystem 206 compares the extracted real time state of health of the battery with a prestored state of health of a battery including of a predefined number of charge-discharge cycles of the battery. Further, the battery charging pattern score estimation subsystem 206 calculates a first score point for a degradation of charge patterns of the battery based on the comparison between the extracted real time state of health of the battery with the prestored state of health of the battery. In an embodiment, the first score point refers to one single point that may be added to a final cumulative point.

In one exemplary embodiment, the battery charging pattern score estimation subsystem 206 of the electric vehicle rewarding system 108 extracts a real time data of the state of health from the plurality of secondary vehicle parameters from the plurality of slave controllers 106 (i.e., specifically from the battery management system 502) as 90% state of health. Upon extracting, the battery charging pattern score estimation subsystem 206 compares with the prestored state of health of the battery which has nearby data as 95% state of health of battery at 300 cycles.

In one embodiment, the actual state of health of the battery is 90% and the prestored state of health of the battery is 95%. In such embodiment, a scaling output is actual/prestored value, i.e., 90/95=0.947. The first score point is 9.47. In an embodiment, this first score point remains the same until the user performs next charging cycle. In an embodiment, charge-discharge cycle represents one cycle with charging and discharging until the electric vehicle 102 battery is put for charge again.

In an embodiment, for such calculation of the first score point, the battery management system 502 submits the discharge current of battery to vehicle data receiving system 204 and the motor controller unit 504 submits the distance driven. The battery charging pattern score estimation system 206 computes the state of health of the battery based upon the inputs received and performs the scoring calculation as described above based upon scaling (i.e., extraction and comparison processes).

The plurality of subsystems 110 further include the braking pattern score estimation subsystem 214. In an embodiment, the plurality of subsystems 110 may include the braking pattern score estimation subsystem 214 that may be communicatively connected to the hardware processor(s) 220. The braking pattern score estimation subsystem 214 in the cloud 112 extracts an acceleration and deceleration data of the electric vehicle 102, and a number of brakes being applied during driving of the electric vehicle 102 from the plurality of primary vehicle parameters. Specifically, the braking pattern score estimation subsystem 214 extracts (a) the acceleration and deceleration data of the electric vehicle 102 from the IMU sensor 408 and (b) data associated with the number of brakes being applied (i.e., brake data) during driving of the electric vehicle 102 from the brake switch sensor 402. In an embodiment, the number of brakes being applied to drive a kilometer of the electric vehicle 102. In another embodiment, the limitation may be exceed more than one kilometer. In an embodiment, the brake data for a specific kilometre distance may include data from more than one electric vehicle 102. In an embodiment, the braking pattern score estimation subsystem 214 may extract acceleration and deceleration data of the electric vehicle 102, and the number of brakes being applied during driving of the electric vehicle 102 from the plurality of primary vehicle parameters in the cloud 112.

The braking pattern score estimation subsystem 214 calculates a second score point for the braking applied during driving of the electric vehicle 102 based on the extracted acceleration and deceleration data of the electric vehicle 102 and the number of brakes being applied during driving of the electric vehicle 102. For example, the braking pattern score estimation subsystem 214 scores 10 for the electric vehicle 102 with least braking. The remaining electric vehicles may get corresponding scores from braking pattern score estimation subsystem 214 based on the scaling (i.e., calculation). In an embodiment, the braking pattern score estimation subsystem 214 calculates the second score point in the cloud 112.

The plurality of subsystems 110 further include the braking pattern score receiving subsystem 208 that is communicatively connected to the hardware processor(s) 220. The braking pattern score receiving subsystem 208 is configured to receive the calculated second score point from the braking pattern score estimation subsystem 214.

The plurality of subsystems 110 include the battery efficacy score estimation subsystem 210 that is communicatively connected to the hardware processor(s) 220. The battery efficacy score estimation subsystem 210 is configured to measure battery efficiency. In an embodiment, the battery efficiency is measured based on a plurality of factors including at least one of: sudden current drawn during overload, improper tire pressure, and the like. The battery efficacy score estimation subsystem 210 initially calculates power consumed during driving at a specified distance based on at least one of: the plurality of primary vehicle parameters and the plurality of secondary vehicle parameters received from the vehicle data receiving subsystem 204.

The battery efficacy score estimation subsystem 210 further compares the calculated power consumed at the specified distance with a prestored energy consumption level at specified distance (i.e., a prestored dataset). In an embodiment, the prestored energy consumption level is stored in the database 224. The battery efficacy score estimation subsystem 210 further calculates a third score point for the power consumed at the specified distance in one or more test parameters. In an embodiment, the third score point corresponds to a battery efficacy score. In an embodiment, the prestored energy consumption level is updated using a deep machine learning model based on changes of the one or more test parameters.

In one embodiment, the one or more test parameters include at least one of: a constant (e.g., 5 meter) velocity stretch of the electric vehicle 102 for the user with a rider, the constant velocity stretch of the electric vehicle 102 for gross weight of the electric vehicle 102, and the constant velocity stretch of the electric vehicle 102 for overload (e.g., 20% overload). The above three scenario measurements are taken at different tire pressure and data is stored into the database 224. Such database 224 keeps on improving based upon different environmental conditions including at least one of: gradient, tire wear, and the like.

In an exemplary embodiment, "5 metre constant velocity distance with only rider upon the electric vehicle 102 and the electric vehicle 102 battery consumes 'x' Watt/km at specified tire pressure", "5 metre constant velocity distance with rider and pillion upon the electric vehicle 102 and the electric vehicle 102 consumes 'y' Watt/km at specified tire pressure" and "5 metre constant velocity distance with 20% overload upon the electric vehicle 102 and the electric vehicle 102 consumes 'z' Watt/km at specified tire pressure.

In such embodiment, the third score point may be generated as "10 points for less than 'x' Watt/km at specified tire pressure comparison", 9 to 5 points scaling between 'y' and 'z' Watt/km at specified tire pressure comparison", and "0 points for consumption above 'z' Watt/km at specified tire pressure comparison".

Now, since varying tire pressure is not considered for the above calculation, another secondary value will be derived to conclude on score of battery efficacy score estimation subsystem 210. For example, if recommended, tire pressure is 30 psi and if the rider is operating at 27 psi pressure (weightage average of front and rear tire pressure), secondary score is generated. The battery efficacy score estimation subsystem 210 multiplies the third score point and the secondary score to obtain a particular score point.

Furthermore, different scenarios may also generate over a period of time when the tire is having wear and tear, and the electric vehicle 102 battery has degradation. The pre-stored dataset may evolve based on such new different scenarios. This is deep learning of the secondary pre-stored dataset. Further, the battery efficacy score estimation subsystem 210 estimates the efficiency level of the battery associated with the electric vehicle 102. The battery efficacy subsystem 210 further calculates the third score point based on energy/power consumption of the battery to drive specified range of the electric vehicle 102.

The plurality of subsystems 110 further includes the reward score calculation subsystem 212 that is communicatively connected to the hardware processor(s) 220. The reward score calculation subsystem 212 is configured to compute average weightage points of the first score point, the second score point and the third score point from the battery charging pattern score estimation subsystem 206, the braking pattern score receiving subsystem 208, and the battery efficacy score estimation subsystem 210 respectively.

In one embodiment, the average weightage score points of all the electric vehicles 102 are sent the database 224 over the cloud 112 where the hardware processor(s) 220 processes all the real-time information at a specified distance covered by the electric vehicle 102 and provides percentile-based ranking.

The plurality of subsystems 110 further include the ranking subsystem 216. In an embodiment, the plurality of subsystems 110 may include the ranking subsystem 216 that may be communicatively connected to the hardware processor(s) 220. The ranking subsystem 216 is configured to determine rank for the electric vehicle 102 driven by the user in percentile based values based on average weightage points computed for the first score point, the second score point, and the third score point.

The plurality of subsystems 110 include a reward score generation subsystem (not depicted in FIG. 2) that is communicatively connected to the hardware processor(s) 220. The reward score generation subsystem is configured to generate score for the electric vehicle 102 corresponding to the rank determined for the electric vehicle 102 based on the percentile based values in order to reward the user of the electric vehicle 102 on the basis of drivetrain efficiency. In one exemplary embodiment, the user (i.e., driver or plurality of users) with most score points may be provided with incentive facilities. The incentive facilities may include economical insurance facility, low maintenance charge for the electric vehicle 102, and the like. The electric vehicle rewarding system 108 also includes the communication bus 218.

Additionally, the plurality of subsystems 110 includes an output subsystem (not depicted in FIG. 2). The output subsystem that is configured to generate recommendations comprising insights driven from at least one of: the first score point, the second score point and the third score point using an artificial intelligence. The output subsystem further outputs the generated recommendations to the user of the electric vehicle 102. In an embodiment, generated recommendations are outputted to the user of the electric vehicle 102 through a display of at least one of: the electric vehicle 102 and a user device of the user.

The communication bus 218 helps to transfer the computed average score points to the cloud 112 where the hardware processor(s) 220 processes real time information and provides ranking.

Furthermore, when the battery state of charge reaches below "x" value, the electric vehicle rewarding system 108 may restrict the top speed of the electric vehicle 102 to "y" value in order to get maximum efficiency out of the battery. The restriction as stated may hamper acceleration performance but provides good, reserved range during low state of charge condition.

Figure 3A:
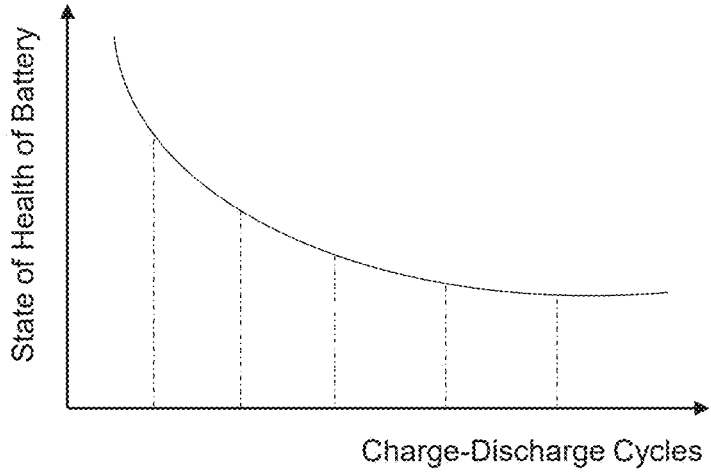
FIG. 3A and FIG. 3B are graphical representations depicting calculation of first score point related to a state of health of a battery and calculation of a second score point related to braking applied during driving of the electric vehicle, in accordance with an embodiment of the present disclosure.
Figure 3B:
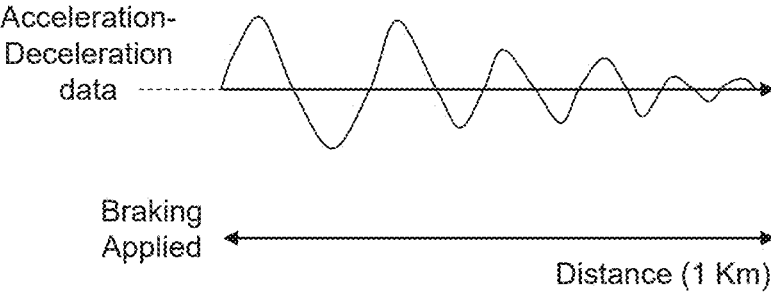

FIG. 3A and FIG. 3B are graphical representations depicting calculation of the first score point related to the state of health of the battery and calculation of the second score point related to the braking applied during driving of the electric vehicle 102, in accordance with an embodiment of the present disclosure. The first score point associated with the state of health of the battery is calculated by dividing the actual state of health of the battery by the prestored state of health of the battery including the charge-discharge cycle, as shown in FIG. 3A. The charge-discharge cycle represents the one cycle with charging and discharging until the electric vehicle 102 battery is put for charge again.

Further, the second score point associated with the braking applied during driving of the electric vehicle 102 is calculated by calculating the number of brakes being applied during driving of the electric vehicle (102) at a specified kilometer (i.e., 1 km) distance and calculation of the acceleration and deceleration data of the electric vehicle (102), as shown in FIG. 3B.

Figure 4:
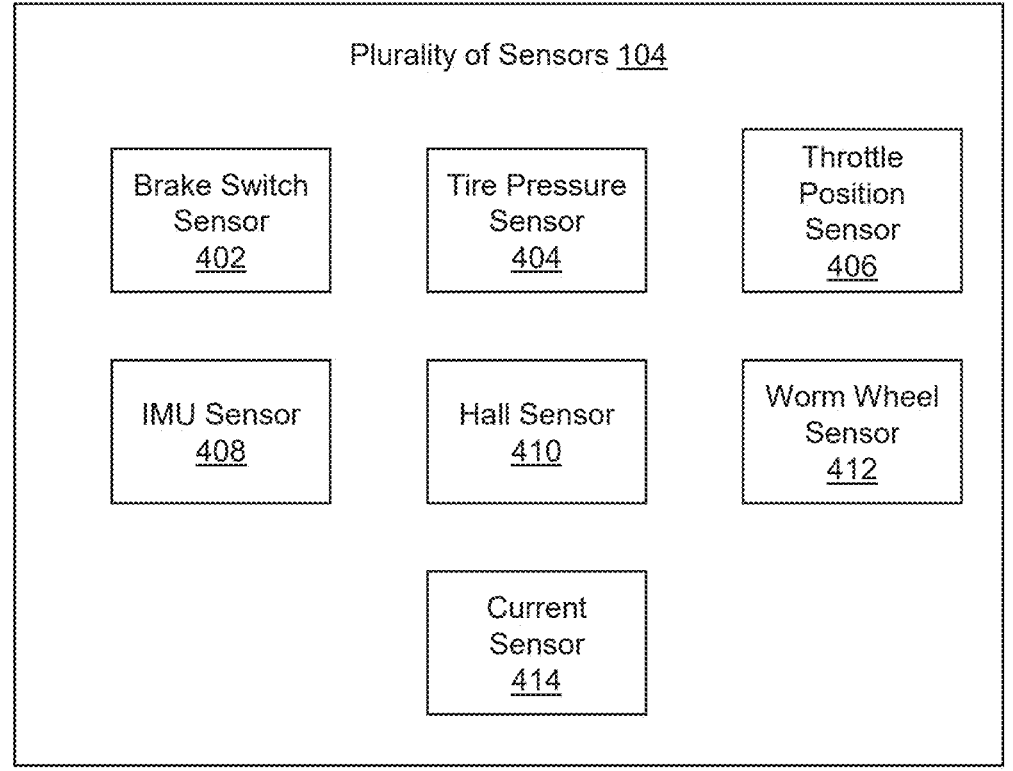
FIG. 4 is an exploded view of a plurality of sensors arranged at a plurality of positions of the electric vehicle, as such those shown in FIG. 1, in accordance with an embodiment of the present disclosure.

FIG. 4 is an exploded view of the plurality of sensors 104 arranged at the plurality of positions of the electric vehicle 102, such as those shown in FIG. 1, in accordance with an embodiment of the present disclosure. The plurality of sensors 104 include the brake switch sensor 402 detects the brake application during electric vehicle 102 operation. The tire pressure sensor 404 measures the tire pressure of the electric vehicle 102 in real time.

The throttle position sensor 406 measures the degree of throttle the electric vehicle 102 driver is rotating while operating the electric vehicle 102. In such embodiment, if the throttle is rotated to 30-degree, 2.5 volts signal is passed as measurement. If the throttle is rotated to 60-degree, 5 volts signal is passed as measurement. The hall sensor 410 measures the revolutions per minute at which the motor of the electric vehicle 102 is running. In one specific embodiment, the brake switch sensor 402 measurement, the throttle position sensor 406 measurement and the hall sensor 410 measurements are passed on to the motor controller unit 504 of the electric vehicle 102 for operation.

The worm wheel sensor 412 measures the speed of the electric vehicle 102. An inertial measurement unit (IMU) sensor 408 is the electronic device that measures and reports an electric vehicle body's 102 specific force, angular rate, and sometimes the orientation of the electric vehicle 102 body, using a combination of accelerometers, gyroscopes, and sometimes magnetometers. The current sensor 414 is the device that detects electric current in a wire and generates a signal proportional to that current and helps to estimate the state of charge of the electric vehicle 102.

In operation, the plurality of sensors 104 capture the plurality of primary vehicle parameters like brake on/off, throttle position, tire pressure, instantaneous acceleration & deceleration, revolutions per minute of motor or wheel and discharge current of the battery from the electric vehicle 102 and transfers it to the plurality of slave controllers 106 or directly to the electric vehicle rewarding system 108. In such embodiment, the real time captured plurality of primary vehicle parameters are transferred to a computing system 106.

Figure 5:
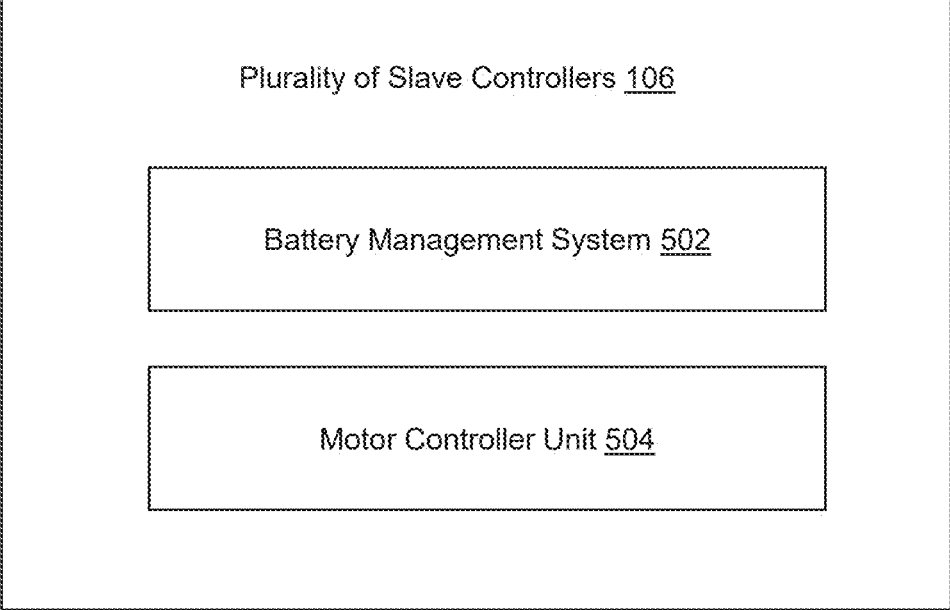
FIG. 5 is an exploded view of a plurality of slave controllers, such as those shown in FIG. 1, in accordance with an embodiment of the present disclosure.

FIG. 5 is an exploded view of a plurality of slave controllers 106, as such those shown in FIG. 1, in accordance with an embodiment of the present disclosure. The plurality of slave controllers 106 includes the battery management system 502 and the motor controller unit 504. The battery management system 502 provide information about how many charging cycles has occurred and those charging started and ended at what charge levels. The battery management system 502 also provides energy consumed to drive one km which enables us to know whether the electric vehicle 102 is overloaded, or acceleration/braking is harsh. The motor controller unit 504 provides revolutions per minute data and additionally data whether brake is applied or not.

Figure 6:
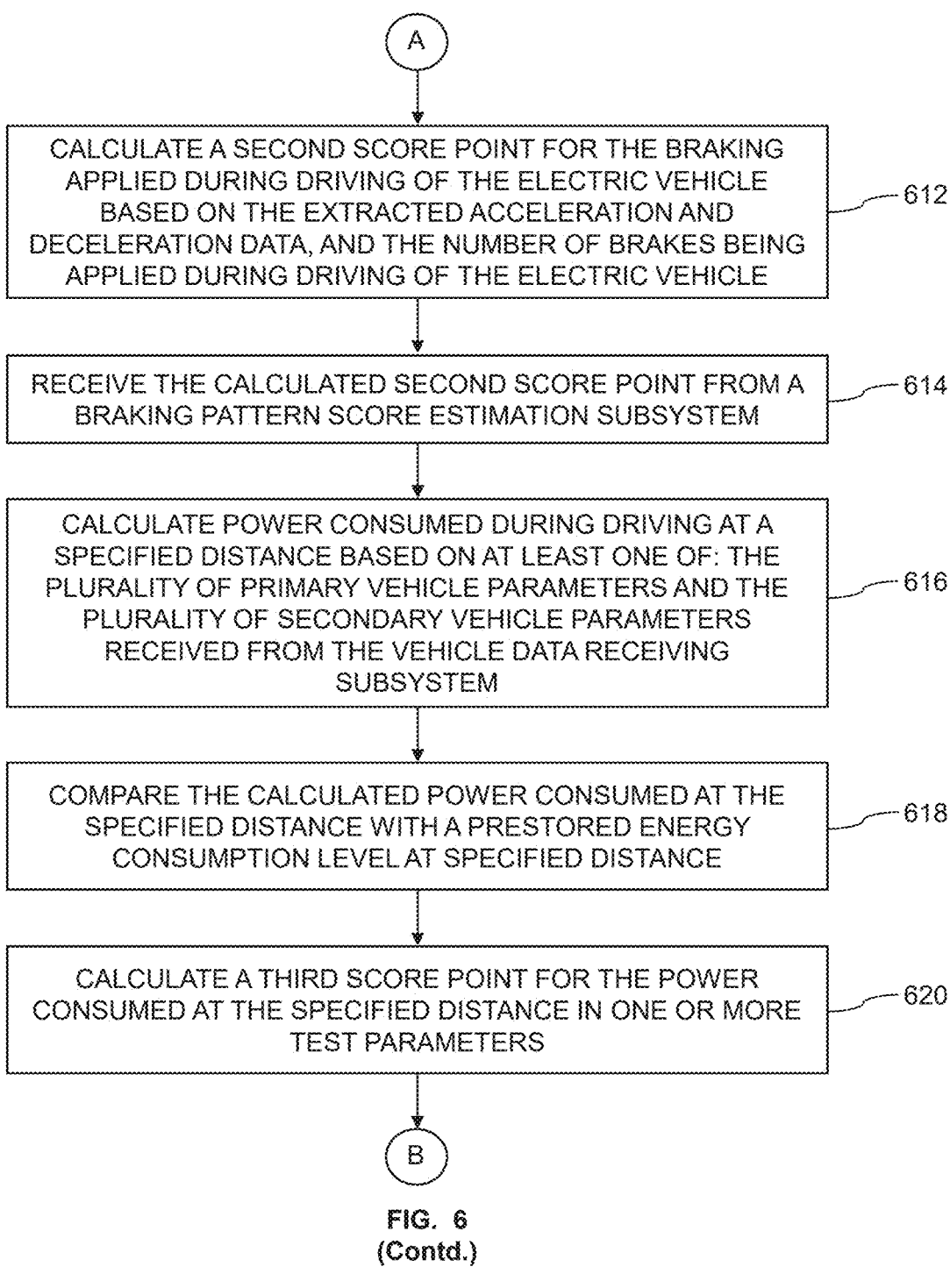
FIG. 6 is a process flowchart illustrating an exemplary method for interacting with the user of the electric vehicle, as such those shown in FIG. 1, in accordance with an embodiment of the present disclosure.

FIG. 6 is a process flowchart illustrating an exemplary method 600 for interacting with the user of the electric vehicle 102 user and for rewarding the user, as such those shown in FIG. 1, in accordance with an embodiment of the present disclosure. At step 602, the plurality of primary vehicle parameters and the plurality of secondary vehicle parameters are received from at least one of: a plurality of sensors 104 and a plurality of slave controllers 106. At step 604, the real time state of health of a battery including the state of discharge current of the battery, and the distance driven by the user are extracted from the received plurality of secondary vehicle parameters.

At step 606, the extracted real time state of health of the battery are compared with the prestored state of health of the battery including of the predefined number of charge-discharge cycles of the battery. At step 608, a first score point is calculated for a degradation of charge patterns of the battery based on the comparison between extracted real time state of health of the battery with the prestored state of health of the battery. At step 610, the acceleration and deceleration data of the electric vehicle 102, and a number of brakes being applied during driving of the electric vehicle 102 are extracted from the plurality of primary vehicle parameters.

At step 612, a second score point for the braking applied during driving of the electric vehicle 102 is calculated based on the extracted acceleration and deceleration data of the electric vehicle 102 and the number of brakes being applied during driving of the electric vehicle 102. At step 614, the calculated second score point is received from the braking pattern score estimation subsystem 214. At step 616, the power consumed during driving at a specified distance is calculated based on at least one of: the plurality of primary vehicle parameters and the plurality of secondary vehicle parameters received from the vehicle data receiving subsystem 204.

At step 618, the calculated power consumed at the specified distance is compared with a prestored energy consumption level at specified distance. At step 620, a third score point for the power consumed at the specified distance in one or more test parameters is calculated. In an embodiment, the third score point corresponds to a battery efficacy score. At step 622, a rank is determined for the electric vehicle 102 in percentile based values based on average weightage points computed for the first score point, the second score point, and the third score point. At step 624, recommendations including insights driven from at least one of: the first score point, the second score point and the third score point using an artificial intelligence are generated. At step 626, the generated recommendations are outputted to the user of the electric vehicle 102.

The method further includes computing of the average weightage points of the first score point, the second score point and the third score point from the battery charging pattern score estimation subsystem 206, the braking pattern score receiving subsystem 208, and the battery efficacy score estimation subsystem 210. The method further include generating score for the electric vehicle 102 corresponding to the rank determined for the electric vehicle 102 based on the percentile based values. In an embodiment, the score may be generated for providing incentive facilities to the plurality of users of the plurality of electric vehicles 102. The incentives include at least one of: economical insurance facility, and low maintenance charge for the electric vehicle 102.

In one embodiment, the electric vehicle rewarding subsystem 108 also includes categorizing average score points of any driver over the cloud to generate ranking and incentivise the best ones. In such embodiment, the driver with most score points may be provided with incentive facilities. The incentive facilities may include economical insurance facility, low maintenance charge, and the like.

The electric vehicle rewarding system 108 for rewarding a driver of an electric vehicle 102 considers all parameters like charging patterns, braking patterns while driving, battery efficiency with respect to overload & tire pressure. The stated parameters affect the efficiency of drive train based upon usage pattern of an electric vehicle 102 and driving parameters of the electric vehicle 102 will help to increase the efficiency of drive train of an electric vehicle 102. The electric vehicle rewarding system 108 will compute rewards and penalty points for the electric vehicle 102 and may offer rewards to the electric vehicle 102 owners in order to boost their confidence about the right usage pattern of an electric vehicle 102 which helps to increase the efficiency of drive train.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random-access memory (RAM), a read-only memory (ROM), a rigid magnetic disk and an optical disk. Current examples of optical disks include compact disk-read only memory (CD-ROM), compact disk-read/write (CD-R/W) and DVD.

Input/output (I/O) devices (as shown in FIG. 1) (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments may include a hardware configuration of an information handling/computer system in accordance with the embodiments herein. The system herein comprises at least one processor or central processing unit (CPU). The CPUs are interconnected via system bus to various devices such as a random-access memory (RAM), read-only memory (ROM), and an input/output (I/O) adapter. The I/O adapter can connect to peripheral devices, such as disk units and tape drives, or other program storage devices that are readable by the system. The system can read the inventive instructions on the program storage devices and follow these instructions to execute the methodology of the embodiments herein.

The system 100 comprising of the electric vehicle rewarding system 108 further includes a user interface adapter that connects a keyboard, mouse, speaker, microphone, and/or other user interface devices such as a touch screen device (not shown) to the bus to gather user input. Additionally, a communication adapter connects the bus to a data processing network, and a display adapter connects the bus to a display device which may be embodied as an output device such as a monitor, printer, or transmitter, for example.

A description of an embodiment with several components in communication with each other does not imply that all such components are required. On the contrary, a variety of optional components are described to illustrate the wide variety of possible embodiments of the invention. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, order of processes described herein may be changed and are not limited to the manner described herein. Moreover, the actions of any flow diagram need not be implemented in the order shown; nor do all of the acts need to be necessarily performed. Also, those acts that are not dependant on other acts may be performed in parallel with the other acts. The scope of embodiments is by no means limited by these specific examples.

We claim:

1. A system for interacting with a user of an electric vehicle using an electric vehicle rewarding system, the system comprising:

one or more hardware processors; and a memory coupled to the one or more hardware processors 220, wherein the memory comprises a set of program instructions in the form of a plurality of subsystems, configured to be executed by the one or more hardware processors, and wherein the plurality of subsystems comprises:

a vehicle data receiving subsystem configured to receive a plurality of primary vehicle parameters and a plurality of secondary vehicle parameters from at least one of:

a plurality of sensors, and a plurality of slave controllers;

a battery charging pattern score estimation subsystem configured to:

extract at least one of: a real time state of health of a battery comprising a state of discharge current of the battery, and a distance driven by a user from the received plurality of secondary vehicle parameters;

compare the extracted real time state of health of the battery with a prestored state of health of a battery comprising of a predefined number of charge-discharge cycles of the battery; and calculate a first score point for a degradation of charge patterns of the battery based on the comparison between the extracted real time state of health of the battery with the prestored state of health of the battery;

a braking pattern score estimation subsystem configured to:

extract an acceleration and deceleration data of the electric vehicle, and a number of brakes being applied during driving of the electric vehicle from the plurality of primary vehicle parameters; and calculate a second score point for the braking applied during driving of the electric vehicle based on the extracted acceleration and deceleration data of the electric vehicle and the number of brakes being applied during driving of the electric vehicle;

a braking pattern score receiving subsystem configured to receive the calculated second score point from the braking pattern score estimation subsystem;

a battery efficacy score estimation subsystem configured to:

calculate power consumed during driving at a specified distance based on at least one of: the plurality of primary vehicle parameters and the plurality of secondary vehicle parameters received from the vehicle data receiving subsystem;

compare the calculated power consumed at the specified distance with a prestored energy consumption level at specified distance; and calculate a third score point for the power consumed at the specified distance in one or more test parameters, wherein the third score point corresponds to a battery efficacy score;

a ranking subsystem configured to determine a rank for the electric vehicle in percentile based values based on average weightage points computed for the first score point, the second score point, and the third score point; and an output subsystem configured to generate recommendations comprising insights driven from at least one of: the first score point, the second score point and the third score point using an artificial intelligence; and output the generated recommendations to the user of the electric vehicle;

wherein the electric vehicle rewarding system is configured to restrict a top speed of the electric vehicle to a predefined maximum efficiency value when a state of charge of the battery reaches below a predefined state of charge value of the battery.

2. The system as claimed in claim 1, further comprising a reward score calculation subsystem configured to compute the average weightage points of the first score point, the second score point and the third score point from the battery charging pattern score estimation subsystem, the braking pattern score receiving subsystem, and the battery efficacy score estimation subsystem.

3. The system as claimed in claim 1, further comprising a reward score generation subsystem configured to generate score for the electric vehicle corresponding to the rank determined for the electric vehicle based on the percentile based values.

4. The system as claimed in claim 1, further comprising the plurality of sensors arranged at a plurality of positions of the electric vehicle, wherein the plurality of sensors capture the plurality of primary vehicle parameters in real time, and wherein the plurality of primary vehicle parameters comprise at least one of: the number of brakes being applied during driving of the electric vehicle, tire pressure of the electric vehicle, a degree of throttle which the user rotates while operating the electric vehicle, an acceleration and deceleration at a particular distance, revolutions per minute (rpm) at which a motor of the electric vehicle is running, speed of the electric vehicle, and an estimation of a state of charge of the electric vehicle.

5. The system as claimed in claim 1, further comprising the plurality of slave controllers arranged in the electric vehicle, wherein the plurality of slave controllers capture the plurality of secondary vehicle parameters in real time, and wherein the plurality of secondary vehicle parameters comprise at least one of: occurrence of charging of the battery, charging levels on which the charging of the battery is started and ended, energy consumed to drive the electric vehicle for one kilometer (km) distance to determine whether the electric vehicle is overloaded, and applied acceleration/brake is harsh, the state of health (SOH) of the battery comprising a state of charge-discharge current of the battery, and applying of the brake based on revolutions per minute data.

6. The system as claimed in claim 1, wherein the one or more test parameters comprise at least one of: a constant velocity stretch of the electric vehicle for the user with a rider, the constant velocity stretch of the electric vehicle for gross weight of the electric vehicle, and the constant velocity stretch of the electric vehicle for overload.

7. The system as claimed in claim 4, wherein the plurality of sensors comprise at least one of:

a brake switch sensor that measures the number of brakes being applied during driving of the electric vehicle;

a tire pressure sensor that measures the tire pressure of the electric vehicle;

a throttle position sensor that measures the degree of throttle which the user rotates while operating the electric vehicle;

an inertial measurement unit (IMU) sensor that measures at least one of: force, angular rate, orientation, and the acceleration and deceleration at the particular distance of the electric vehicle;

a hall sensor that measures the revolutions per minute (rpm) at which the motor of the electric vehicle is running;

a worm wheel sensor that measures the speed of the electric vehicle; and a current sensor that measures electric current in a wire and generates a signal proportional to the electric current to estimate the state of charge of the electric vehicle.

8. The system as claimed in claim 5, wherein the plurality of slave controllers comprise at least one of:

a battery management system that provides the second data related to at least one of: the state of health (SOH) of the battery comprising the state of charge-discharge current of the battery, the occurrence of charging of the battery, charging levels on which the charging of the battery is started and ended, the energy consumed to drive the electric vehicle for one kilometer (km) distance to determine whether the electric vehicle is overloaded, and the applied acceleration/brake is harsh; and a motor controller unit that provides the second data related to applying of the brake based on the revolutions per minute data.

9. The system as claimed in claim 1, wherein the output subsystem outputs the generated recommendations to the user of the electric vehicle through a display of at least one of: the electric vehicle and a user device of the user.

10. The system as claimed in claim 1, wherein the first score point is calculated by dividing extracted real time state of health of the battery by the prestored state of health of the battery comprising of the predefined number of charge-discharge cycles of the battery.

11. The system as claimed in claim 1, wherein the braking pattern score estimation subsystem is further configured to:

extract data associated with the number of brakes being applied during driving of the electric vehicle at a specified kilometer distance from the plurality of primary vehicle parameters; and calculate the second score point in a cloud based on the data extracted from the plurality of primary vehicle parameters, wherein the electric vehicle with least braking obtains the higher second score point among a plurality of electric vehicles.

12. The system as claimed in claim 1, wherein the third score point is calculated as a highest predefined numeral point for less than 'x' Watt/km at specified tire pressure comparison, wherein the third score point is calculated as moderate predefined numeral points between 'y' and 'z' Watt/km at specified tire pressure comparison, and wherein the third score point is calculated as a lowest predefined numeral point for consumption above 'z' Watt/km at specified tire pressure comparison.

13. The system as claimed in claim 1, wherein the prestored energy consumption level is updated using a deep machine learning model based on changes of the one or more test parameters.

14. The system as claimed in claim 1, wherein the plurality of sensors transmit the plurality of primary vehicle parameters to at least one of: the plurality of slave controllers, and the electric vehicle rewarding system.

15. The system as claimed in claim 1, wherein the braking pattern score estimation subsystem and the ranking subsystem are arranged in a cloud network.

16. A method for interacting with a user of an electric vehicle using an electric vehicle rewarding system, the method comprising:

receiving, using one or more hardware processors, a plurality of primary vehicle parameters, and a plurality of secondary vehicle parameters from at least one of: a plurality of sensors and a plurality of slave controllers;

extracting, using the one or more hardware processors, at least one of: a real time state of health of a battery comprising a state of discharge current of the battery, and a distance driven by a user from the received plurality of secondary vehicle parameters;

comparing, using the one or more hardware processors, the extracted real time state of health of the battery with a prestored state of health of a battery comprising of a predefined number of charge-discharge cycles of the battery;

calculating, using the one or more hardware processors, a first score point for a degradation of charge patterns of the battery based on the comparison between the extracted real time state of health of the battery with the prestored state of health of the battery;

extracting, using the one or more hardware processors, an acceleration and deceleration data of the electric vehicle, and a number of brakes being applied during driving of the electric vehicle from the plurality of primary vehicle parameters;

calculating, using the one or more hardware processors, a second score point for the braking applied during driving of the electric vehicle based on the extracted acceleration and deceleration data of the electric vehicle and the number of brakes being applied during driving of the electric vehicle;

receiving, using the one or more hardware processors, the calculated second score point from a braking pattern score estimation subsystem;

calculating, using the one or more hardware processors, power consumed during driving at a specified distance based on at least one of: the plurality of primary vehicle parameters and the plurality of secondary vehicle parameters received from the vehicle data receiving subsystem;

comparing, using the one or more hardware processors, the calculated power consumed at the specified distance with a prestored energy consumption level at specified distance;

calculating, using the one or more hardware processors, a third score point for the power consumed at the speci-fied distance in one or more test parameters, wherein the third score point corresponds to a battery efficacy score;

determining, using the one or more hardware processors, a rank for the electric vehicle in percentile based values based on weightage average points computed for the first score point, the second score point and the third score point;

generating, using the one or more hardware processors, recommendations comprising insights driven from at least one of: the first score point, the second score point and the third score point using an artificial intelligence; and outputting, using the one or more hardware processors, the generated recommendations to the user of the electric vehicle; and restricting, using the one or more hardware processors, a top speed of the electric vehicle to a predefined maxi-mum efficiency value when a state of charge of the battery reaches below a predefined state of charge value of the battery.

17. The method as claimed in claim 16, further compris-ing computing, using the one or more hardware processors, the weightage average points for the first score point, the second score point and the third score point.

18. The method as claimed in claim 16, further compris-ing generating, using the one or more hardware processors, score for the electric vehicle corresponding to the rank determined for the electric vehicle based on the percentile based values.

19. The method as claimed in claim 16, wherein the plurality of primary vehicle parameters comprise at least one of: the number of brakes being applied during driving of the electric vehicle, tire pressure of the electric vehicle, a degree of throttle which the user rotates while operating the electric vehicle, an acceleration and deceleration at a particular distance, revolutions per minute (rpm) at which a motor of the electric vehicle is running, speed of the electric vehicle, and an estimation of a state of charge of the electric vehicle.

20. The method as claimed in claim 16, wherein the plurality of secondary vehicle parameters comprise at least one of: occurrence of charging of the battery, charging levels on which the charging of the battery is started and ended, energy consumed to drive the electric vehicle for one kilometer (km) distance to determine whether the electric vehicle is overloaded, and applied acceleration/brake is harsh, the state of health (SOH) of the battery comprising a state of charge-discharge current of the battery, and applying of the brake based on revolutions per minute data.

21. The method as claimed in claim 16, wherein the plurality of sensors comprises at least one of: a brake switch sensor, a tire pressure sensor, a throttle position sensor, an inertial measurement unit (IMU) sensor, a hall sensor, a worm wheel sensor, and a current sensor.

22. The method as claimed in claim 16, wherein the plurality of slave controllers comprises at least one of: a battery management system, and a motor controller unit.

23. The method as claimed in claim 16, wherein the one or more test parameters comprise at least one of: a constant velocity stretch of the electric vehicle for the user with a rider, the constant velocity stretch of the electric vehicle for gross weight of the electric vehicle, and the constant velocity stretch of the electric vehicle for overload.

24. The method as claimed in claim 16, wherein the generated recommendations are outputted to the user of the electric vehicle through a display of at least one of: the electric vehicle and a user device of the user.

25. The method as claimed in claim 16, wherein the first score point is calculated by dividing extracted real time state of health of the battery by the prestored state of health of the battery comprising of the predefined number of charge-discharge cycles of the battery.

26. The method as claimed in claim 16, further compris-ing:

extracting, using the one or more hardware processors, data associated with the number of brakes being applied during driving of the electric vehicle at a specified kilometer distance from the plurality of pri-mary vehicle parameters; and calculating, using the one or more hardware processors, the second score point in a cloud based on the data extracted from the plurality of primary vehicle param-eters, wherein the electric vehicle with least braking obtains the higher second score point among a plurality of electric vehicles.

27. The method as claimed in claim 16, wherein the third score point is calculated as a highest predefined numeral point for less than 'x' Watt/km at specified tire pressure comparison, wherein the third score point is calculated as moderate predefined numeral points between 'y' and 'z' Watt/km at specified tire pressure comparison, and wherein the third score point is calculated as a lowest predefined numeral point for consumption above 'z' Watt/km at specified tire pressure comparison.

28. The method as claimed in claim 16, wherein the prestored energy consumption level is updated using a deep machine learning model based on changes of the one or more test parameters.

\* \* \* \* \*